(12) United States Patent
Schmitz et al.

(10) Patent No.: US 8,841,403 B2
(45) Date of Patent: Sep. 23, 2014

(54) USE OF METAL SALTS OF A CARBOXYLIC ACID IN THE PRODUCTION OF POLYURETHANE SYSTEMS

(75) Inventors: Sarah Schmitz, Essen (DE); Roland Hubel, Essen (DE)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 12/836,155

(22) Filed: Jul. 14, 2010

(65) Prior Publication Data
US 2011/0015290 A1    Jan. 20, 2011

(30) Foreign Application Priority Data
Jul. 18, 2009 (DE) .......................... 10 2009 033 710

(51) Int. Cl.
| | |
|---|---|
| *C08G 18/08* | (2006.01) |
| *C08G 18/48* | (2006.01) |
| *C08G 18/24* | (2006.01) |
| *C08L 75/08* | (2006.01) |
| *C08G 18/18* | (2006.01) |
| *C08G 18/76* | (2006.01) |
| *C08G 101/00* | (2006.01) |

(52) U.S. Cl.
CPC ......... *C08L 75/08* (2013.01); *C08G 2101/0008* (2013.01); *C08G 18/4833* (2013.01); *C08G 18/244* (2013.01); *C08G 18/1816* (2013.01); *C08G 18/7621* (2013.01); *C08G 2101/005* (2013.01); *C08G 2101/0083* (2013.01)
USPC ............... 528/58; 528/57; 521/137; 521/155; 521/156; 521/157; 521/158; 521/159; 521/160; 521/170; 521/172; 521/174

(58) Field of Classification Search
USPC .............. 528/57, 58; 521/137, 155, 156, 157, 521/158, 159, 160, 170, 172, 174; 502/131, 502/352, 521, 528
See application file for complete search history.

(56) References Cited

U.S. PATENT DOCUMENTS

| | | | |
|---|---|---|---|
| 3,164,557 A | 1/1965 | Merten et al. | |
| 3,245,958 A | 4/1966 | Hindersinn et al. | |
| 3,347,804 A | * | 10/1967 | Buckley ........................ 521/124 |
| 3,397,158 A | 8/1968 | Britain et al. | |
| 3,468,991 A | 9/1969 | Krug | |

(Continued)

FOREIGN PATENT DOCUMENTS

| | | |
|---|---|---|
| CN | 1662574 A | 8/2005 |
| DE | 10 2009 033 710 A1 | 1/2011 |

(Continued)

OTHER PUBLICATIONS

Properties of Auxiliary Organo-Tin Catalysts in Polyurethane Foams. Carl S. Mullender. Catalysts in Polyurethane Foams a One-Day Seminar organized by Rapra Technology Limited. 1997.*

(Continued)

*Primary Examiner* — Michael L Leonard
(74) *Attorney, Agent, or Firm* — Scully, Scott, Murphy & Presser, P.C.

(57) ABSTRACT

A catalyst system which is suitable for catalyzing the production of polyurethane systems is provided. The catalyst system contains a metal salt of a carboxylic acid to whose carbonyl carbon a hydrogen atom or a hydrocarbon radical is bound, with the proviso that the carboxylic acid does not have exclusively a single ethyl or n-propyl branch in the 2 position.

5 Claims, 1 Drawing Sheet

(56) References Cited

U.S. PATENT DOCUMENTS

| | | | |
|---|---|---|---|
| 3,470,121 | A | 9/1969 | Cobbledick et al. |
| 3,595,734 | A | 7/1971 | Krug |
| 4,031,049 | A | 6/1977 | Hirosawa et al. |
| 4,048,129 | A * | 9/1977 | Voigt ............... 525/262 |
| 4,438,038 | A * | 3/1984 | Petronella ............ 554/74 |
| 4,456,696 | A | 6/1984 | Arbir et al. |
| 4,584,362 | A | 4/1986 | Leckart et al. |
| 4,598,136 | A * | 7/1986 | Wick .................. 528/56 |
| 5,206,200 | A | 4/1993 | Bush et al. |
| 6,100,311 | A * | 8/2000 | Eling ................ 521/170 |
| 6,194,475 | B1 | 2/2001 | Boinowitz et al. |
| 2003/0130365 | A1* | 7/2003 | Eling et al. ............ 521/99 |
| 2006/0035994 | A1 | 2/2006 | Kaplan |
| 2006/0199933 | A1 | 9/2006 | Okamoto et al. |
| 2010/0069518 | A1* | 3/2010 | Mispreuve et al. ...... 521/126 |

FOREIGN PATENT DOCUMENTS

| | | | |
|---|---|---|---|
| EP | 0 876 416 | | 8/1999 |
| EP | 1013704 | A2 | 6/2000 |
| EP | 2 256 141 | A2 | 12/2010 |
| EP | 2 289 960 | A1 | 3/2011 |
| EP | 2 289 960 | B1 | 8/2012 |
| GB | 991545 | | 5/1965 |
| GB | 1197314 | | 7/1970 |
| JP | 2002047330 | * | 2/2002 ............ C08G 18/42 |
| JP | 2003-26751 | | 1/2003 |
| JP | 2005-307164 | | 11/2005 |
| JP | 2007-169432 | | 7/2007 |
| WO | WO 97/27236 | A1 | 7/1997 |
| WO | WO 98/21254 | | 5/1998 |
| WO | WO 2004/000905 | A1 | 12/2003 |
| WO | WO 2004/000906 | A1 | 12/2003 |
| WO | WO-2006/125258 | * | 11/2006 ............ C08K 3/04 |
| WO | WO2008116605 | A1 | 10/2008 |
| WO | WO 2009/029626 | A1 | 3/2009 |

OTHER PUBLICATIONS

U.S. Appl. No. 12/873,800 entitled "Low-Phosphorus Lamination Additives Having Low Emission, Improved Initial Adhesion and Improved Hydrolysis stability" filed on Sep. 1, 2010, first named inventor: Sarah Schmitz.

European Search Report dated Aug. 26, 2010.

Chinese Office Action dated Aug. 1, 2012 from related Chinese Application No. 201010231620.8 together with an English-language translation.

European Search Report dated Aug. 20, 2012 from related European Application No. 12172115.3.

European Opposition dated May 24, 2013 received from related Application No. 10166434.0.

Cheng C.Y., "Solvent Extraction of Nickel and Cobalt With Synergistic Systems Consisting of Carboxylic Acid and Aliphatic Hydroxyoxime", Hydrometallurgy 84:109-117 (2006).

European Opposition dated Mar. 21, 2013 received from related Application No. 10166434.0.

European Notice of Opposition Letter dated Mar. 14, 2013 received from related Application No. 10166434.0 on behalf of the Dow Chemical Company.

European Search Report dated Aug. 20, 2012 received from related Application No. 12172115.3.

Notice of Reasons for Rejection dated Dec. 2, 2013 received from the Japanese Patent Office from related Application No. 2010-161685, together with an English-language translation.

Chinese Office Action dated Jun. 25, 2014 received from related Application No. 201310128320.0, together with an English-language translation.

MSDS-Product Safety Assessment METATIN™ Catalyst S-26 (Stannous Octoate), The Dow Chemical Company (6 pages) (Mar. 9, 2011).

Information der Onlinedatenbank PubChem-"Stannous Octate", Compound Summary for: CID 159632 (7 pages) (2014).

Römpp OnlineLexkon "Octoate" (2014).

Information der Onlinedatenbank PubChem, "2-Ethylhexanoic Acid Tin(II)"-Compound Summary for: CID 9318 (8 pages) (2014).

European Opposition Proceedings Document dated Apr. 25, 2014 received from related Application No. 10166434.0.

European Search Report dated Jul. 3, 2014 received from related Application No. 14169212.9.

\* cited by examiner

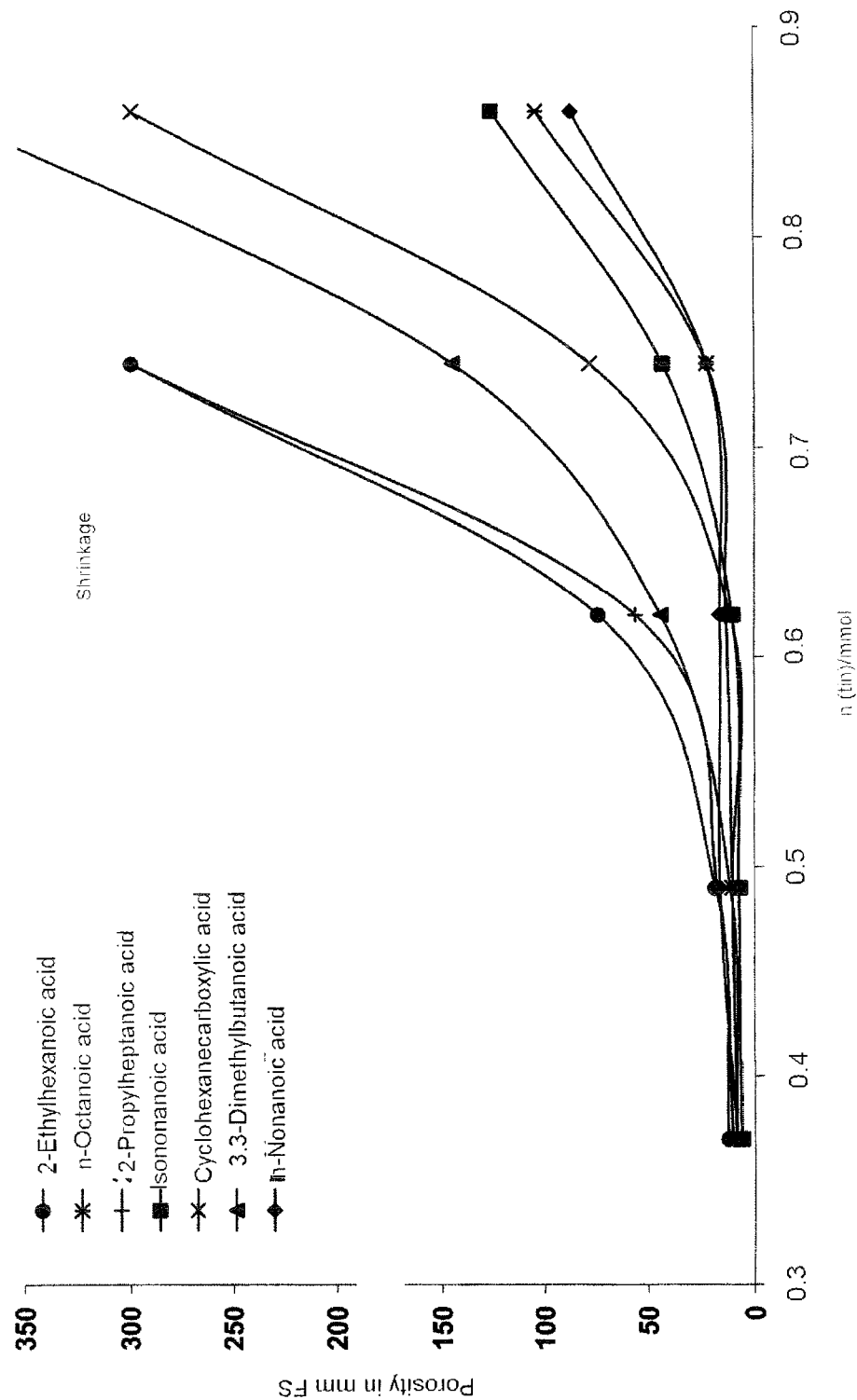

USE OF METAL SALTS OF A CARBOXYLIC ACID IN THE PRODUCTION OF POLYURETHANE SYSTEMS

RELATED APPLICATIONS

This application claims priority under 35 U.S.C. §119(a)-(d) of German Patent Application No. 102009033710.5, filed Jul. 18, 2009.

FIELD OF THE INVENTION

The invention relates to the use of metal salts of carboxylic acids, in particular 3,5,5-trimethylhexanoic acid and n-octanoic acid, and solutions thereof in the production of polyurethane systems (PUR systems).

BACKGROUND

Polyurethane systems include, for example, polyurethane coatings, polyurethane adhesives, polyurethane sealants, polyurethane elastomers or polyurethane foams.

Owing to their excellent mechanical and physical properties, polyurethane foams are used in a wide variety of fields. A particularly important market for various types of PUR foams, e.g., conventional flexible foams based on ether polyols and ester polyols, high-resilience foams (frequently referred to as HR foams), rigid foams, integral foams and microcellular foams, and also foams whose properties lie between these classifications, e.g., semirigid systems, is the automobile industry and the furniture industry. For example, rigid foams are used as roof lining, ester foams are used for interior cladding of doors and for stamped-out sun visors, while high-resilience foams and flexible foams are used for seat systems and mattresses.

Catalysts suitable for one-component moisture-reactive polyurethane compositions typically contain tin compounds such as tin carboxylates, in particular tin octoate (corresponds to tin 2-ethylhexanoate), frequently combined with tertiary amines.

The use of tin octoate in the production of flexible PUR foams based on polyetherols is described, for example, in Steve Lee, Huntsman Polyurethanes, The Polyurethanes Book, Verlag Wiley, pp. 140, 143-144, and Ron Herrington, Flexible Polyurethane Foams, Dow Chemical, pp. 2.30. The tin octoate serves as a catalyst for the reaction of isocyanates with polyols (also referred to as a gelling catalyst) via a complex transition state. During production of the foam, the tin octoate hydrolyses and liberates both the salt of 2-ethylhexanoic acid and also the acid itself. The decomposition is desirable because the backreaction of urethane formation to reform the starting materials is suppressed, but it should not, where possible, lead to liberation of possibly toxicologically problematical substances. The patent literature, too, contains numerous patent applications which describe the use of said tin octoate, e.g., see BE 779607, GB 1432281, GB 1422056, GB 1382538, GB 1012653, GB 982280. In these documents, catalyst systems comprising tin octoate are preferably used.

However, such tin catalysts have recently been coming under increasing pressure from users because of toxicological concerns regarding the starting materials, in particular the ligands, used for producing them. There is therefore an increasing need for less toxicologically problematical alternatives.

To meet the requirements, which have become significantly more demanding in recent years, in which the automobile and furniture industries and their foam suppliers have to meet in respect of emission and toxicity specifications, catalyst systems that contain less toxic ligands which can be polymerized into the foam have been developed. Such systems are described, for example, in EP 1013704. The disadvantage of these systems is the higher amounts needed and the associated costs because of the lower tin content and the strong shielding of the active tin by the ligands. The systems have to date been one of the few alternatives to the widespread tin octoate catalyst system (tin(II) salt of 2-ethylhexanoic acid) or organotin compounds such as dibutyltin dilaurate. The latter systems are to be viewed critically because of the toxicity of the substances emitted. 2-ethylhexanoic acid, for example, which is liberated during and after foaming gives cause for concern because of possible damage to an unborn child (development damage) in human beings (R 63).

Bismuth catalysts represent a further alternative to conventional tin catalysts. Bismuth catalysts which are known for polyurethane compositions are, for example, bismuth carboxylates, e.g., bismuth octoate (bismuth salt of 2-ethylhexanoic acid), as mentioned in WO 98/36007. However, the catalytic activity of bismuth compounds in respect of the isocyanate-water reaction is significantly lower than that of tin catalysts and the emission of 2-ethylhexanoic acid is a problem in these catalyst systems as well.

A further disadvantage of the stated catalyst systems is their very narrow processing latitude. It has been observed that, in corresponding catalyst systems, a catalyst system which is varied slightly to higher use amounts leads to very closed-celled foams or severe shrinkage.

SUMMARY

The present invention provides a catalyst system which does not have one or more of the abovementioned disadvantages.

Particularly, the present invention provides catalyst systems which are suitable for catalyzing the production of polyurethane (PU) systems and are characterized in that the catalyst systems contain at least one metal salt of a carboxylic acid to whose carbonyl carbon a hydrogen atom or a hydrocarbon radical is bound, with the proviso that the carboxylic acid does not have exclusively a single ethyl or n-propyl branch in the 2 position, (i.e., the carboxylic acid has to have at least one further branch in the alkyl chain in any position, e.g., methyl branches, in addition to the ethyl or n-propyl branch in the 2 position or be linear). The present invention also provides for the use of such catalyst systems in the production of polyurethane systems and also provides corresponding polyurethane systems, in particular polyurethane foams and their use.

The catalyst system of the invention has the advantage that it is suitable both for producing flexible foams based on ether polyols and ester polyols and also for producing rigid foams and foams whose properties lie between these classifications, e.g., semirigid foams.

The use of the catalyst system of the present invention makes it possible to produce polyurethane systems using toxicologically unproblematical starting materials which do not emit any toxicologically problematical dissociation products even under extreme thermal conditions. The catalyst systems of the present invention also have the advantage that a wider processing latitude is available in PU foam production. These advantages are able to be achieved without adversely affecting the other physical properties, e.g., density, hardness, rebound resilience or compression load deflection. The compression load deflection can even be improved by the use of the catalyst system of the invention.

BRIEF DESCRIPTION OF THE DRAWINGS

The sole drawing of the present disclosure is a graph showing the results of Example 36 of the present invention in which the molar amount of tin in the respective catalyst system in mmol is plotted on the X axis and the porosity in of liquid (column liquid (FS)) of the resulting foams is plotted on the Y-axis.

DETAILED DESCRIPTION

The catalyst systems of the invention, the process for producing the polyurethane foams, the polyurethane foams themselves and their uses are described below by way of example without the invention being restricted to these illustrative embodiments. Where ranges, general formulae or classes of compounds are indicated below, these encompass not only the respective ranges or groups of compounds which are explicitly mentioned but also all subranges and subgroups of compounds which can be obtained by leaving out individual values (ranges) or compounds. Where documents are cited in the present description, their contents, in particular with regard to the subjects under consideration, are fully incorporated by reference into the disclosure content of the present invention.

The catalyst system of the invention, which is suitable for catalyzing the production of polyurethane foams, is characterized in that it contains a metal salt of a carboxylic acid to whose carbonyl carbon a hydrogen atom or a hydrocarbon radical is bound, with the proviso that the carboxylic acid does not have exclusively a single ethyl or n-propyl branch in the 2 position. The hydrocarbon radical is preferably selected so that the acid has at least one carbon atom, preferably from 6 to 17 carbon atoms, more preferably from 8 to 13 carbon atoms. The hydrocarbon radical can be saturated or unsaturated, preferably saturated. Preference is given to acids which do not have a branch or at least one methyl group branch or a cycloalkyl radical being present. For the present purposes, the expression methyl group branches refers to an alkylcarboxylic acid whose alkyl radical is branched and which has one or more methyl groups. Preferred catalyst systems are those which do not comprise any carboxylic acids or salts thereof having a single ethyl or n-propyl branch, e.g., ethylhexanoic acid. The catalyst system preferably comprises, as metal salts, only metal salts which are salts of carboxylic acids that are unbranched or have exclusively methyl branches.

Catalyst systems which are preferred according to the invention and contain at least one metal salt of a carboxylic acid bearing methyl groups comprise one or more metal salts selected from among the salts of n-octanoic acid, n-nonanoic acid and 3,5,5-trimethylhexanoic acid (isononanoic acid).

The metal salts are preferably salts of metals of main group Ia, IIa, IVa or Va and of transition group Ib, IIb or VIIIb of the Periodic Table of the Elements (CAS notation). Preferred salts are salts of the metals Na, K, Mg, Ca, Sn, Pb, Bi, Zn, Cu, Fe, Co or Ni, particularly preferably salts of tin.

The catalyst system can comprise exclusively the metal salts or the metal salts in combination with a solvent, e.g., water or one or more organic solvents. The metal salt is preferably used alone (in undissolved form). If the metal salt is used as a solution or in combination with a solvent, the catalyst system preferably contains an organic aprotic solvent. If the catalyst system contains an organic solvent, the organic solvent is preferably selected from among polyols, esters, polyesters, olefins, phthalates, end-capped polyethers and mineral oils. If the metal salt is used as a solution or in combination with a solvent, the mass ratio of metal salt to solvent is preferably from 100:1 to 1:2, more preferably from 50:1 to 1:1 and particularly preferably from 25:1 to 2:1.

Apart from the metal salt(s) and one or more solvents, the catalyst system can comprise further components, e.g., one or more tertiary amines, one or more silicone stabilizers and, if appropriate, one or more emulsifiers. However, it is preferably present separately or as a solution.

The catalyst system of the invention can be used, in particular, for producing polyurethane coatings, polyurethane adhesives, polyurethane sealants, polyurethane elastomers or polyurethane foams, preferably for producing polyurethane foams. The catalyst system of the invention is preferably added to the reaction mixture before or during the reaction, preferably by means of a mixing head.

As stated above, the catalyst system can comprise further constituents such as water, tertiary amine, silicone stabilizer and, if appropriate, emulsifier. Such a solution of the catalyst is frequently referred to as an activator solution. However, the catalyst system is preferably added separately.

In the process of the invention, the direct introduction of the catalyst system which comprises exclusively the metal salt or salts is preferred. If this is not possible because the metal salt has an excessively high viscosity or is a solid, the metal salts can be introduced directly in the form of a solution. Tin isononate and tin n-octoate (salt of n-octanoic acid) have the advantage that concentration fluctuations do not result in a defective foam. In contrast, the direct introduction of the viscous tin octoate (salt of 2-ethylhexanoic acid) into the polyurethane system components, in particular foaming components, can, owing to the only small amounts required and the strong influence of this catalyst on the gelling reaction, lead to problems. Since many foamers have only direct introduction, a product which is subject to relatively small fluctuations is of great advantage.

As an alternative to direct foaming, the catalyst system can also be introduced in diluted from. Here, preference is given to water-free solutions since some transition metal salts have only limited hydrolysis stability.

The catalyst systems of the invention can be used as catalysts in the usual formulations for producing polyurethane systems, in particular polyurethane foams, comprising one or more organic isocyanates having two or more isocyanate functions, one or more polyols having two or more groups which are reactive towards isocyanate, if appropriate further catalysts for the isocyanate-polyol and/or isocyanate-water reactions and/or isocyanate trimerization, water, optionally physical blowing agents, optionally flame retardants and, if appropriate, further additives.

Suitable isocyanates for the purposes of the present invention are preferably all polyfunctional organic isocyanates, for example diphenylmethane 4,4'-diisocyanate (MDI), toluene diisocyanate (TDI), hexamethylene diisocyanate (HMDI) and isophorone diisocyanate (IPDI). The mixture of MDI and more highly condensed analogues having an average functionality of from 2 to 4, which is known as "polymeric MDI" ("crude MDI"), and also the various isomers of TDI in pure form or as an isomer mixture are particularly suitable.

Suitable polyols for the purpose of the present invention are preferably all organic substances having a plurality of groups which are reactive towards isocyanates, and also preparations thereof. Preferred polyols are all polyether polyols and polyester polyols which are customarily used for producing polyurethane systems, in particular polyurethane foams. Polyether polyols are obtained by reacting polyfunctional alcohols or amines with alkylene oxides. Polyester polyols are based on esters of polybasic carboxylic acids (which can be either aliphatic, for example adipic acid, or aromatic, for example phthalic acid or terephthalic acid) with polyhydric alcohols (usually glycols). In addition, polyethers based on natural oils (natural oil based polyols, NOPs) can also be used. These polyols are obtained from natural oils, e.g., soybean oil or palm oil, and can be used in unmodified or modified form.

A suitable ratio of isocyanate to polyol, expressed as the index of the formulation, is in the range from 10 to 1000, preferably from 40 to 350. This index describes the ratio of isocyanate actually used to calculated isocyanate (for a stoichiometric reaction of polyol). An index of 100 refers to a molar ratio of the reactive groups of 1:1.

Further suitable catalysts for the purposes of the present invention are substances which catalyze the gelling reaction (isocyanate-polyol), the blowing reaction (isocyanate-water) or the dimerization or trimerization of the isocyanate. Typical examples are amines such as triethylamine, dimethylcyclohexylamine, tetramethylethylenediamine, tetra-methylhexanediamine, pentamethyldiethylenetriamine, pentamethyldipropylenetriamine, triethylenediamine, dimethylpiperazine, 1,2-dimethylimidazole, N-ethylmorpholine, tris(dimethylaminopropyl)hexahydro-1,3,5-triazine, dimethylaminoethanol, dimethylaminoethoxyethanol and bis(dimethylaminoethyl)ether, tin compounds such as dibutyltin dilaurate and potassium salts such as potassium acetate. Preference is given to using catalysts which do not contain any tin compounds, in particular do not contain any tin organic compound, as dibutyltin dilaurate, as further catalysts.

Suitable use amounts depend on the type of catalyst and are typically in the range from of 0.01 to 5 pphp (=parts by weight per 100 parts by weight of polyol) or from 0.1 to 10 pphp for potassium salts.

Suitable water contents for the purposes of the present invention depend on whether or not physical blowing agents are used in addition to water. In the case of purely water-blown foams, the values are typically from 1 to 20 pphp; if other blowing agents are used in addition, the amount used is usually reduced to 0 or 0.1-5 pphp. To achieve high foam densities, neither water nor other blowing agents are used.

Suitable physical blowing agents for the purposes of the present invention are gases, for example liquefied $CO_2$, and volatile liquids, for example hydrocarbons having 4 or 5 carbon atoms, preferably cyclopentane, isopentane and n-pentane, fluorinated hydrocarbons, preferably HFC 245fa, HFC 134a and HFC 365mfc, chlorofluorocarbons, preferably HCFC 141b, oxygen-containing compounds such as methyl formate and dimethoxymethane, or chlorinated hydrocarbons, preferably dichloromethane and 1,2-dichlorethane. Further blowing agents that can be used include ketones (e.g., acetone) or aldehydes (e.g., methylal).

Apart from water and, if appropriate, physical blowing agents, other chemical blowing agents which react with isocyanates to evolve gas, for example formic acid or carbonates, can also be used.

Suitable flame retardants for the purposes of the present invention are preferably liquid organic phosphorus compounds such as halogen-free organic phosphates, e.g., triethyl phosphate (TEP), halogenated phosphates, e.g., tris(1-chloro-2-propyl)phosphate (TCPP) and tris(2-chloroethyl) phosphate (TCEP), and organic phosphonates, e.g., dimethyl methanephosphonate (DMMP), dimethyl propanephosphonate (DMPP), or solids such as ammonium polyphosphate (APP) and red phosphorus. Furthermore, halogenated compounds, for example halogenated polyols, and also solids such as expandable graphite and melamine are suitable as flame retardants.

The processing of the formulations to produce foams can be carried out by all methods with which those skilled in the art are familiar, for example by manual mixing or preferably by means of high-pressure foaming machines. It is possible to use batch processes, for example for the production of moulded foams, refrigerators and panels, or continuous processes, for example in the case of insulation boards, metal composite elements, blocks or sprayed foam.

The process of the invention makes it possible to obtain polyurethane systems, in particular polyurethane foams, which are characterized in that they comprise at least one or more carboxylic acids to whose carbonyl carbon a hydrocarbon radical is bound, with the proviso that the carboxylic acid does not have a single ethyl or n-propyl group in the 2 position, or a metal salt thereof, in particular the above-described carboxylic acids/salts. The polyurethane systems of the invention, preferably polyurethane foams, preferably comprise exclusively carboxylic acids or salts thereof which are exclusively unbranched or have methyl group branches.

Preferred polyurethane systems according to the invention, in particular polyurethane foams, are characterized in that the proportion by mass of carboxylic acids or carboxylates to whose carbonyl carbon a hydrocarbon radical is bound, with the proviso that the carboxylic acid does not have a single ethyl or n-propyl branch in the 2 position, is from 0.001 to 5% by mass, based on the weight of the overall foam, preferably from 0.01 to 1.5% by mass.

The polyurethane systems of the invention can be, for example, polyurethane coatings, polyurethane adhesives, polyurethane sealants, polyurethane elastomers or polyurethane foams, in particular a flexible polyurethane foam, a rigid polyurethane foam, a viscoelastic foam, an HR foam, a semirigid polyurethane foam, a thermoformable polyurethane foam or an integral foam. The term polyurethane is here used as generic term for a polymer produced from diisocyanates or polyisocyanates and polyols or other species which are reactive toward isocyanate, e.g., amines, with the urethane bond not having to be the exclusive or predominant type of bond. Polyisocyanurates and polyureas are expressly included.

The polyurethane systems of the invention, in particular the polyurethane foams, can be used, for example, as refrigerator insulation, insulation board, sandwich element, pipe insulation, spray foam, 1- & 1.5-component can foam, imitation wood, modelling foam, packaging foam, mattresses, furniture upholstery, automobile seat upholstery, headrests, dashboards, automobile interior trim, automobile roof cladding, sound absorption material, steering wheel, shoe sole, carpet backing foam, filter foam, sealing foam, sealant and adhesive.

The present invention is described by way of example in the examples reported below without the invention, whose scope is defined by the total description and the claims, being restricted to the embodiments mentioned in the examples.

EXAMPLES

Examples 1 to 35

Production of Polyurethane Foams

The following formulation was used for producing polyurethane foams: 100 parts by weight of polyetherol (hydroxyl number=47 mg KOH/g, 11-12% of EO), 4 parts by weight of water, 1 part by weight of TEGOSTAB® BF 2370 (silicone stabilizer from Evonik Goldschmidt GmbH), 0.1 part by weight of a tertiary amine, 50.6 parts by weight of toluene diisocyanate T 80 (Index 110) and a variable amount of KOSMOS® 29 (tin octoate, Evonik Goldschmidt GmbH) or the tin carboxylates to be examined. For comparison, 2-ethylhexanoic acid, 2-ethylbutyric acid and 2-propylheptanoic acid, viz. molecules having a close structural relationship to tin isononoate (tin salt of 3,5,5-trimethylhexanoic acid), were selected as compounds not according to the invention.

Foaming was carried out using 400 g of polyol, and the other constituents of the formulation were graduated accordingly. Table 1 summarizes the variable constituents of the formulations of example foams 1 to 35.

To carry out foaming, the polyol, water, amine, tin catalyst and silicone stabilizer were mixed well by stirring. After addition of the isocyanate, the mixture was stirred for 7 seconds at 3000 rpm by means of a stirrer. The mixture obtained was poured into a paper-lined wooden box (base area 27 cm×27 cm). This gave a foam which was subjected to the use-related tests described below.

TABLE 1

Variable constituents of the formulations of example foams 1 to 35.

| Example No. | According to the invention | Salt[1] | Catalyst [parts by weight] |
|---|---|---|---|
| 1 | no | a) | 0.15 |
| 2 | no | a) | 0.20 |
| 3 | no | a) | 0.25 |
| 4 | no | a) | 0.30 |
| 5 | no | a) | 0.35 |
| 6 | no | b) | 0.17 |
| 7 | no | b) | 0.23 |
| 8 | no | b) | 0.285 |
| 9 | no | b) | 0.34 |
| 10 | no | b) | 0.40 |
| 11 | yes | c) | 0.16 |
| 12 | yes | c) | 0.215 |
| 13 | yes | c) | 0.27 |
| 14 | yes | c) | 0.33 |
| 15 | yes | c) | 0.38 |
| 16 | yes | d) | 0.30 |
| 17 | yes | d) | 0.40 |
| 18 | yes | d) | 0.50 |
| 19 | yes | d) | 0.60 |
| 20 | yes | d) | 0.70 |
| 21 | yes | e) | 0.137 |
| 22 | yes | e) | 0.18 |
| 23 | yes | e) | 0.228 |
| 24 | yes | e) | 0.274 |
| 25 | yes | e) | 0.32 |
| 26 | yes | f) | 0.128 |
| 27 | yes | f) | 0.17 |
| 28 | yes | f) | 0.213 |
| 29 | yes | f) | 0.256 |
| 30 | yes | f) | 0.299 |
| 31 | yes | g) | 0.16 |
| 32 | yes | g) | 0.21 |
| 33 | yes | g) | 0.267 |
| 34 | yes | g) | 0.32 |
| 35 | yes | g) | 0.374 |

[1] a) = tin(II) salt of 2-ethylhexanoic acid
b) = tin(II) salt of 2-propylheptanoic acid
c) = tin(II) salt of isononanoic acid
d) = tin(II) salt of n-octanoic acid (50% diluted by weight in DPG)
e) = tin(II) salt of cyclohexanecarboxylic acid
f) = tin(II) salt of 3,3-dimethylbutanoic acid
g) = tin(II) salt of n-nonanoic acid Physical Properties of the Foams The foams produced were assessed by means of the following physical properties:

a) Settling of the foams after the rise phase (=settling):
   The settling, or after-rise, was given by the difference in the foam height after direct release and 3 minutes after release of the foam. The foam height was measured by means of a needle fastened to a centimetre scale at the maximum in the middle of the foam dome.
b) Foam height:
   The final height of the foam was determined by subtracting or adding the settling or the after-rise, respectively, from or to the foam height after release.
c) Foam density (FD):
   The determination was carried out as described in ASTM D 3574-08 under test A by measuring the core density.
d) Air permeability/porosity
e) Compression load deflection CLD, 40%
f) Compression set after compression by 90% for 22 h at 70° C.
g) Rebound resilience (ball rebound test)
   Tests e) to g) were carried out in accordance with ASTM D 1564-71.

Test d) was carried out as follows:
Method:
The air permeability/porosity of the foam was determined by means of a banking-up pressure measurement on the foam. The measured banking-up pressure was reported in mm of alcohol, with the lower banking-up pressure values characterizing the more open foam. The values were measured in the range from 0 to 300 mm.

Apparatus:
The measurement apparatus was supplied by the in-house nitrogen line and was therefore connected to the latter and comprises the following parts connected to one another:
   reducing valve with manometer,
   flow regulating screw,
   wash bottle,
   flow measurement instrument,
   T-piece,
   lay-on nozzle,
   graduated glass tube, filled with alcohol.

The wash bottle is only obligatory when the apparatus is not supplied from the in-house line but directly with industrial bottled gas.

The flow measurement instrument had to be calibrated in accordance with the manufacturer's instructions using the calibration curves supplied and provided with a marking at 8 l/min=480 l/h before being used for the first time.

The lay-on nozzle had an edge length of 100×100 mm, a weight in the range from 800 to 1000 g, an internal width of the outflow opening of 5 mm, internal width of the lower lay-on ring of 30 mm.

The measurement liquid (technical-grade alcohol (ethanol)) can be coloured to increase the optical contrast.

Measurement Procedure:
The nitrogen admission pressure was set to 1 bar by means of the reducing valve. The flow was adjusted to the appropriate 480 l/h by means of the flow regulating screw. The amount of liquid in the graduated glass tube was brought by means of alcohol to a level at which no pressure difference is built up and can be read off. For the actual measurement of the test specimen, five individual measurements, four on the four corners and one in the middle of the test specimen, were carried out. For this purpose, the lay-on nozzle was laid on at the corners flush with the edges; the middle of the test specimen is estimated. The reading was taken when a constant banking-up pressure had been established.

Evaluation:
The upper measurement limit of the method was 300 mm of liquid (CL). For recording, three different cases had to be distinguished:
1. All five values were below 300 mm CL. In this case, the arithmetic mean was formed and recorded.
2. All five values were greater than or equal to 300 mm CL. In this case, the value >300 or 300 should be recorded.
3. Of the five measured values, a) values can be determined explicitly, b) values were greater than or equal to 300: the arithmetic mean of five values was formed, with 300 being used in each case for the b) measured values. The number of values greater than or equal to 300 was also recorded separated from the mean by an oblique stroke.

Example:
Four measured values correspond to 180, 210, 118 and 200 mm CL; one measured value was >300 mm CL (180+210+118+200+300)/5. Recorded entry: 202/1.

The results are summarized in Table 2.

TABLE 2

Results of the determination of the physical properties

| Ex. No. | Rise time [s] | Settling [cm] | Height cm] | FD [kg/m³] | Porosity [mm] | CLD 40% [kPa] | Compression set | Rebound [cm] |
|---|---|---|---|---|---|---|---|---|
| 1 | 112 | −0.2 | 31.8 | 24.6 | 9 | 4.5 | 6 | 39 |
| 2 | 99 | −0.2 | 33.4 | 23.9 | 33 | 5.2 | 9 | 42 |
| 3 | 92 | +0.5 | 34.1 | 23.2 | 201 | 5.9 | 34 | 44 |
| 4 | 84 | +1.2 | 35.3 | 25.8 | 300 | 7.1 | 72 | 42 |
| 5 | 80 | +1.7 | 36.2 | Shrinkage | — | — | — | — |
| 6 | 119 | +0.1 | 30.1 | 24.9 | 10 | 4.0 | 5 | 41 |
| 7 | 104 | −0.2 | 30.9 | 25.0 | 17 | 4.5 | 8 | 41 |
| 8 | 95 | −0.1 | 32.0 | 24.3 | 56 | 4.9 | 12 | 44 |
| 9 | 90 | +0.4 | 32.7 | 23.0 | 300 | 5.3 | 74 | 41 |
| 10 | 86 | +0.8 | — | Shrinkage | — | — | — | — |
| 11 | 131 | +0.2 | 30.4 | 24.7 | 6 | 3.6 | 5 | 43 |
| 12 | 111 | ±0.0 | 30.6 | 24.7 | 7 | 4.0 | 5 | 42 |
| 13 | 100 | −0.1 | 31.2 | 24.7 | 10 | 4.4 | 6 | 41 |
| 14 | 90 | ±0.0 | 32.1 | 24.3 | 43 | 4.9 | 9 | 40 |
| 15 | 85 | +0.3 | 32.8 | 23.6 | 126 | 5.2 | 70 | 36 |
| 16 | 126 | +1.1 | 30.3 | 24.1 | 8 | 3.5 | 5 | 46 |
| 17 | 107 | −0.1 | 31.1 | 24.5 | 10 | 3.8 | 4 | 44 |
| 18 | 95 | −0.1 | 31.6 | 24.6 | 13 | 4.2 | 4 | 42 |
| 19 | 87 | −0.1 | 32.4 | 24.3 | 22 | 4.7 | 6 | 37 |
| 20 | 80 | +0.1 | 32.7 | 24.0 | 104 | 5.0 | 7 | 40 |
| 21 | 120 | +0.1 | 30.6 | 24.6 | 8 | 3.6 | 4 | 43 |
| 22 | 104 | −0.1 | 31.1 | 24.6 | 10 | 4.0 | 5 | 42 |
| 23 | 92 | −0.2 | 31.8 | 24.6 | 11 | 4.6 | 6 | 42 |
| 24 | 85 | ±0.0 | 32.6 | 24.0 | 78 | 5.1 | 9 | 42 |
| 25 | 82 | +0.6 | 33.5 | 22.8 | 300 | 5.6 | 81 | 46 |
| 26 | 111 | ±0.0 | 30.8 | 24.7 | 8 | 3.9 | 4 | 43 |
| 27 | 95 | −0.2 | 31.8 | 24.7 | 11 | 4.3 | 5 | 42 |
| 28 | 86 | −0.2 | 32.7 | 24.2 | 44 | 4.8 | 7 | 32 |
| 29 | 79 | +0.2 | 33.6 | 23.3 | 145 | 5.2 | 61 | 41 |
| 30 | 80 | +0.6 | — | Shrinkage | — | — | — | — |
| 31 | 131 | +0.2 | 31.0 | 26.1 | 8 | 2.9 | 6 | 43 |
| 32 | 115 | +1.3 | 31.2 | 23.4 | 16 | 2.8 | 6 | 41 |
| 33 | 100 | −0.1 | 31.4 | 24.3 | 16 | 3.2 | 6 | 41 |
| 34 | 88 | −0.2 | 31.8 | 24.4 | 22 | 3.4 | 8 | 41 |
| 35 | 77 | +0.1 | 32.4 | 23.9 | 87 | 3.8 | 25 | 37 |

As can be seen from the low settling values, stable polyurethane foams can be produced with addition of the metal salts according to the invention of (methyl)alkylcarboxylic acids. The proportions by weight of the respective catalysts were calculated so that the tin content in the systems to be compared is equimolar. When the amount of, for example, tin isononanate is increased, the open-cell nature of the foams is only reduced from 6 to 126 mm of ethanol banking-up pressure, in the case of n-octanoic acid only from 8 to 104 mm. In comparison, significantly smaller amounts of tin octoates (tin 2-ethylhexanoate or tin propylheptanoate) lead to very closed-celled foams through to high shrinkage (Examples 3 to 5 and 8 to 10; mm >300).

Determination of the Emissions

The acid emission was determined by a method based on the Mercedes-Benz test method PB VWT 709.

The procedure for thermodesorption with subsequent coupled gas chromatography-mass spectrometry (GC/MS) is described below.

a) Measurement Technique:
   The thermodesorption was carried out using a thermodesorber "TDS2" with sample changer from Gerstel, Mülheim, in combination with a Hewlett Packard HP6890/HP5973 GC/MSD-system.

b) Measurement Conditions:

| | |
|---|---|
| Thermodesorption | Gerstel TDS 2 |
| Desorption temperature | 90° C. |
| Desorption time | 30 min |
| Flow | 60 ml/min |
| Transfer line | 280° C. |

-continued

| | |
|---|---|
| Cryofocussing | HP 6890 PTV |
| Liner | glass vaporizer tube with silanized glass wool |
| Temperature | −150° C. |
| GC | Capillary GC HP 6890 |
| Injector | PTV split 1:50 |
| Temperature programme | −150° C.; 3 min; ⌇720° C./min; 280° C. |
| Column | 60 m * 0.25 mm Optima 5 MS dF 0.5 µm |
| Flow | 1 ml/min const. flow |
| Temperature programme | 50° C.; 5 min; ⌇3° C./min; 92° C.; ⌇5° C./min; 160° C.; ⌇10° C./min; 280° C.; 20 min |
| Detector | HP MSD 5973 |
| Mode | Scan 29-350 amu 2.3 scans/sec |
| Valuation | valuation of the total ion current chromatogram Calculation of the 2-ethylhexanoic acid peak as toluene equivalent | c) Calibration
   For the calibration, 1 µl of a mixture of toluene and hexadecane in pentane (each 0.6 mg/ml) was introduced into a cleaned adsorption tube filled with Tenax TA (mesh 35/60) and measured (desorption: 5 min; 280° C.)

d) Sample Preparation
   10 mg of foam in three part specimens were pushed into a thermodesorption tube. Care was taken to ensure that the foam was not compressed.

e) Evaluation
   To quantify the acid emission, the peak identified as, for example, 2-ethylhexanoic acid by means of the mass spectrum was determined as ppm of toluene equivalent via its peak area using the response factor of toluene from the calibration.

Table 3 summarizes the results of the acid emissions of selected examples.

TABLE 3

Results of the emission determinations

| No. | according to the invention | Acid | Tin catalyst [parts] | Total emission [µg/g] | Acid emission [µg/g] | Pro-portion of total emission [µg/g] |
|---|---|---|---|---|---|---|
| 2 | no | 2-Ethyl-hexanoic | 0.2 | 830 | 613 | 74 |
| 12 | yes | Isononanoic | 0.215 | 770 | 512 | 66 |
| 7 | no | 2-Propyl-heptanoic | 0.23 | 1190 | 805 | 68 |
| 17[2] | yes | n-Octanoic | 0.2 | 500 | 202 | 40 |
| 32 | yes | n-Nonanoic | 0.215 | 380 | 119 | 31 |

[2]without dilution in DPG

It can clearly be seen from the results that the emission was significantly reduced by use of acids which do not have a 2-ethyl or 2-propyl branch, e.g., isononanoic acid, n-octanoic acid or n-nonanoic acid.

Example 36

Determination of the Influence of the Catalyst Content (Tin Content) on the Porosity of the Foams Foams were produced as indicated in Examples 1 to 35, with the concentration of catalyst system being varied. The foams were produced using tin salts of 2-ethylhexanoic acid, 3,3-dimethyl-butyric acid, 2-propylheptanoic acid, cyclohexanecarboxylic acid and n-octanoic acid. The foams obtained were examined to determine their porosity. The results of these tests are shown in the sole FIGURE that accompanies the present application.

It can easily be seen that when catalyst systems based on cyclohexanecarboxylate, but in particular when based on n-octanoate and isononanoate, were used, a reduction of the air permeability was observed only at significantly higher concentrations. The corresponding catalyst systems thus allowed a considerably greater processing latitude. Particularly when ethyl- and n-propyl-branched carboxylic acids were used, a catalyst system varied slightly in the direction of higher use amounts leads to very closed foams or high shrinkage.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of producing a polyurethane product, the method comprising adding a catalyst to a reaction mixture comprising at least one or more organic isocyanates having two or more isocyanate groups and one or more polyols having two or more groups reactive towards said isocyanate groups, wherein said catalyst is comprised of a tin(II) salt of a carboxylic acid bound by its carbonyl carbon to a saturated hydrocarbon group containing 8 to 13 carbon atoms, wherein said saturated hydrocarbon group has more than one methyl group branch, wherein tin is the only metal in said catalyst.

2. The method according to claim 1, wherein the catalyst system is added to the reaction mixture before or during the reaction.

3. The method according to claim 1, wherein said carboxylic acid is isononanoic acid.

4. The method according to claim 1, further provided that said polyurethane product possesses a porosity of less than 300 mm.

5. The method according to claim 1, wherein said saturated hydrocarbon group does not have a single ethyl or n-propyl branch.

* * * * *